United States Patent
Yamada

(10) Patent No.: US 8,229,611 B2
(45) Date of Patent: Jul. 24, 2012

(54) CHARGE/DISCHARGE CONTROL APPARATUS FOR HYBRID VEHICLE AND CONTROL PROGRAM DEVICE THEREFOR

(75) Inventor: Kazunao Yamada, Anjo (JP)

(73) Assignee: Denso Corporation, Kariya (JP)

( * ) Notice: Subject to any disclaimer, the term of this patent is extended or adjusted under 35 U.S.C. 154(b) by 1142 days.

(21) Appl. No.: 12/080,962

(22) Filed: Apr. 8, 2008

(65) Prior Publication Data

US 2008/0262668 A1 Oct. 23, 2008

(30) Foreign Application Priority Data

Apr. 23, 2007 (JP) ................................. 2007-112756

(51) Int. Cl.
*B60L 9/00* (2006.01)
*H02J 7/14* (2006.01)
*H02J 7/00* (2006.01)
*H02J 7/04* (2006.01)
*H02J 7/06* (2006.01)

(52) U.S. Cl. .......... 701/22; 320/104; 320/134; 320/150; 320/164

(58) Field of Classification Search ........................ None
See application file for complete search history.

(56) References Cited

U.S. PATENT DOCUMENTS

| 5,892,346 | A | 4/1999 | Moroto et al. |
| 6,721,637 | B2 | 4/2004 | Abe et al. |
| 6,814,170 | B2 | 11/2004 | Abe et al. |
| 7,808,214 | B2 * | 10/2010 | Bartilson ...................... 320/167 |
| 7,849,944 | B2 * | 12/2010 | DeVault ..................... 180/65.29 |
| 8,030,883 | B2 * | 10/2011 | Katayama ..................... 320/104 |
| 2003/0015874 | A1 | 1/2003 | Abe et al. |

FOREIGN PATENT DOCUMENTS

| JP | 07-192194 | 7/1995 |
| JP | 08-265909 | 10/1996 |
| JP | 2003-32803 | 1/2003 |
| JP | 2003-32807 | 1/2003 |
| JP | 2004-007969 | 1/2004 |
| JP | 2007-099223 | 4/2007 |

* cited by examiner

*Primary Examiner* — Thomas Tarcza
*Assistant Examiner* — Nagi Murshed
(74) *Attorney, Agent, or Firm* — Harness, Dickey & Pierce, PLC

(57) ABSTRACT

A navigation ECU records a charge-possible point through charging position record processing and records the history of traveling conditions near the charge-possible point through learning control processing. If a destination point on an optimum route is the charge-possible point, the navigation ECU determines a continuous section where the EV traveling is possible up to the charge-possible point based on the history through SOC management plan preparation processing, and changes over the HV traveling and the EV traveling according to the determination through in-travel processing.

11 Claims, 9 Drawing Sheets

| SEGMENT | 31 | 32 | 33 |
|---|---|---|---|
| SPEED | 30 | 40 | 30 |
| GRADIENT | +1° | 0° | 0° |
| CHARGE POINT | 0 | 0 | 1 |

CHARGE/DISCHARGE CONTROL APPARATUS FOR HYBRID VEHICLE AND CONTROL PROGRAM DEVICE THEREFOR

CROSS REFERENCE TO RELATED APPLICATION

This application is based on and incorporates herein by reference Japanese Patent Application No. 2007-112756 filed on Apr. 23, 2007.

FIELD OF THE INVENTION

This invention relates to a charge/discharge control apparatus for a hybrid vehicle and to a control program device for the charge/discharge control apparatus.

BACKGROUND OF THE INVENTION

A hybrid vehicle such as a plug-in hybrid vehicle is equipped with a battery as well as an internal combustion engine and an electric motor as power sources for traveling. The battery supplies electric power to the electric motor and is electrically charged with electric power from an external power source.

In this type of hybrid vehicles, it is desired that the electric power remaining in the battery is consumed to its lower-limit value at the time when the battery is to be charged next time from an external power source so as to lower the pollution and to save energy. On the other hand, if the amount of electric power remaining in the battery reaches the lower-limit value on the way to a battery charging point, the vehicle must travel thereafter with only the internal combustion engine. This makes it difficult to lower the pollution or to save energy. Besides, this decreases the traveling performance of the vehicle.

To counter this drawback, U.S. Pat. No. 5,892,346 (JP 2004-7969A) proposes that, based on a distance from a start point which is a charge-possible point where the battery is charged on an optimum route up to a destination, target amounts of electric power to remain in the battery are set at various points in-travel. Thus, no electric power remains in the battery at the destination point, and the electric power of the battery is supplied to the electric motor based on the target amounts of electric power remaining in the battery.

However, it is difficult to realize the target amounts of electric power remaining in the battery by the above technology. This is because the traveling mode up to the designation point varies every time of traveling. Control processing becomes very complicated for determining the time points for executing the drive of the vehicle by the internal combustion engine, for executing the drive of the vehicle by the electric motor and for executing the charging of the battery by the internal combustion engine to meet the setting.

SUMMARY OF THE INVENTION

It is an object of the present invention to provide a charge/discharge control apparatus for a hybrid vehicle that controls in a simplified manner electric power consumption of a battery up to a charge-possible point by controlling time points for executing the drive of the vehicle by an internal combustion engine, for executing the drive of the vehicle by an electric motor and for charging the battery by the internal combustion engine.

According to the present invention, a traveling mode of a hybrid vehicle is changed between a first mode and a second mode. The first mode uses an internal combustion engine and an electric motor as power sources for driving the hybrid vehicle while allowing the battery to be electrically charged as charging by combustion in which power of the internal combustion engine is utilized, and the second mode mainly uses the electric motor as the power source for driving the hybrid vehicle while prohibiting the charging by combustion.

A charge-possible point is read out from a charge-possible point storage medium storing the charge-possible point at which the battery can be electrically charged with electric power from a power source outside of the hybrid vehicle. An amount of battery power consumption is calculated assuming that the second mode is used over a continuous section tracing along an optimum route from a destination point which is the charge-possible point that is read out based on electric power consumption data stored in an electric power consumption data storage medium and indicative of electric power consumption that affects the battery power consumption when traveling a plurality of roads. A commence point of the continuous section where the second mode is to be used up to the destination point along the optimum route is determined based on the calculated amount of electric power consumption, so that a remaining amount of the battery becomes smaller than a predetermined lower-limit value at the destination point. The traveling mode of the hybrid vehicle is changed from the first mode over to the second mode at the commence point.

BRIEF DESCRIPTION OF THE DRAWINGS

The above and other objects, features and advantages of the present invention will become more apparent from the following detailed description made with reference to the accompanying drawings. In the drawings.

DESCRIPTION OF THE PREFERRED EMBODIMENTS (First Embodiment)

Figure 1:
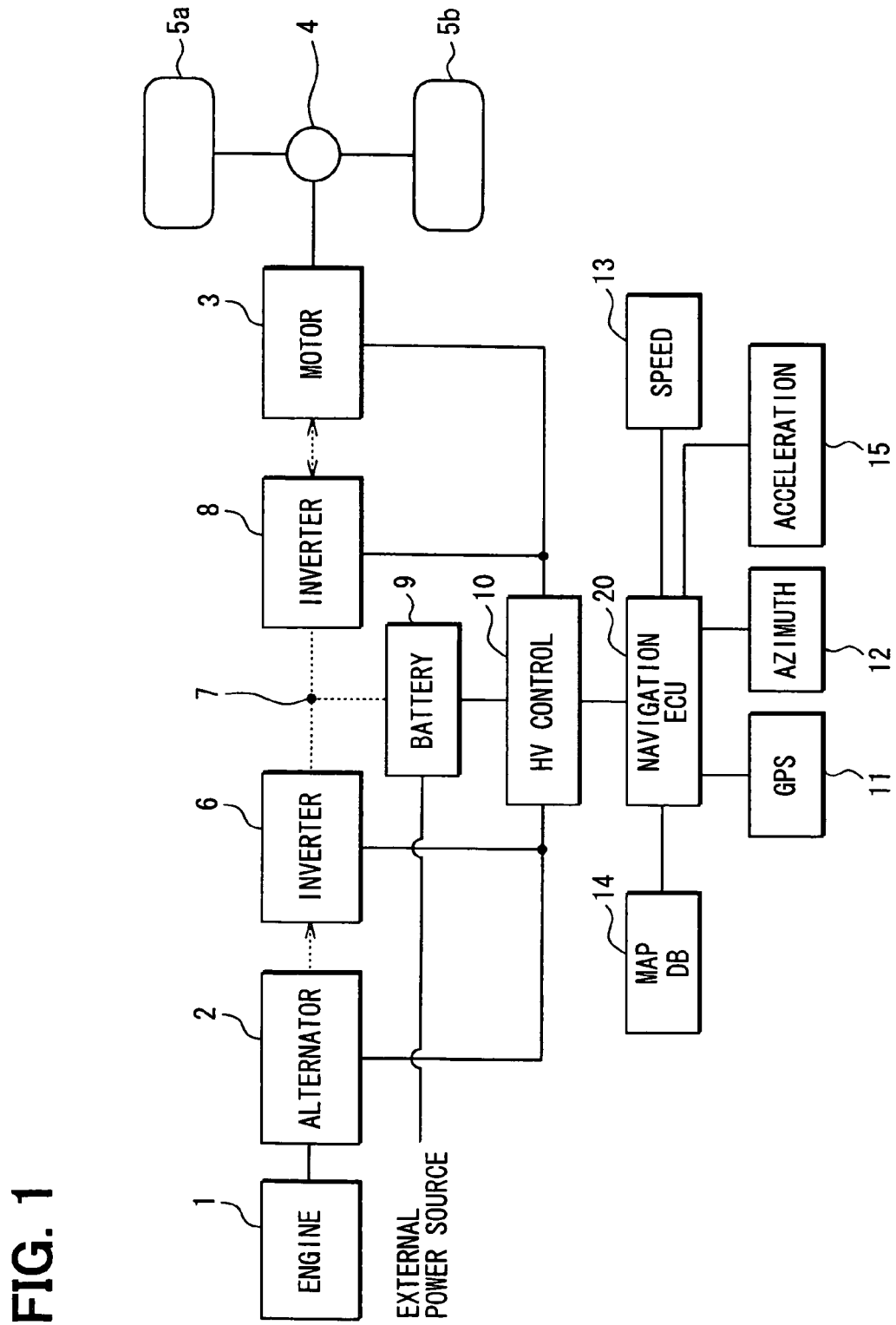
FIG. 1 is a block diagram schematically illustrating a hybrid vehicle to which a first embodiment of a charge/discharge control apparatus of the present invention is applied.

Referring first to FIG. 1, a hybrid vehicle has an internal combustion engine 1, an alternator 2, an electric motor 3, a differential gear 4, tires 5a, 5b, an inverter 6, a DC link 7, an inverter 8, a battery 9, an HV control unit 10, a GPS sensor 11, an azimuth sensor 12, a vehicle speed sensor 13, a map DB storage unit 14, an acceleration sensor 15 and a navigation ECU 20.

The hybrid vehicle travels using the engine 1 and the electric motor 3 as drive power sources. When the engine 1 is used as the drive power source, the rotational force of the engine 1 is transmitted to the tires 5a, 5b via a clutch mechanism (not shown) and the differential gear 4 in the known manner. When the electric motor 3 is used as the drive power source, the DC power of the battery 9 is converted into the AC power through the DC link 7 and the inverter 8, the electric motor 3 is operated by the AC power, and the rotational force of the electric motor 3 is transmitted to the tires 5a, 5b through the differential gear 4.

The rotational force of the engine 1 is transmitted to the alternator 2, too. Due to the rotational force, therefore, the alternator 2 generates AC power, which is then converted into DC power through the inverter 6 and the DC link 7, and stored in the battery 9 thus charging the battery 9. This kind of charging the battery 9 is made due to the operation of the engine 1 using the fuel. Therefore, the charging of this kind is defined as charging by combustion.

Further, when the hybrid vehicle decelerates due to a braking operation by a braking mechanism (not shown), the reactive force at the time of deceleration is provided as a rotational force to the electric motor 3. Due to this rotational force, therefore, the electric motor 3 generates AC power, which is then converted into DC power through the inverter 8 and the DC link 7 to be stored in the battery 9 thus charging the battery 9. Hereinafter, the charging of this kind is called charging by regeneration.

When connected to an external electric power source (for instance, power source supplied via a household power outlet) outside the hybrid vehicle, further, the battery 9 receives the supply of electric power from the external power source and stores the electric power which it has received. This charging is defined as plug-in charging.

Upon receipt of instructions or the like from the navigation ECU 20, the HV control unit 10 controls the execution/non-execution or the like of the above operations of the alternator 2, electric motor 3, inverter 6, inverter 8 and battery 9. The HV control unit 10 may be realized by using, for example, a programmed microcomputer or may be a hardware having a dedicated circuit configuration for realizing the functions described below.

The HV control unit 10 stores three values, that is, a present SOC (state of charge), a reference SOC and a lower-limit SOC, and executes the following processing (A) to (E):

(A) Notifying the start of plug-in charging to the navigation ECU 20;
(B) Changing the traveling mode of the hybrid vehicle over to an HV mode as a first mode and to an EV mode as a second mode based on an instruction from the navigation ECU 20;
(C) Regularly notifying the present SOC to the navigation ECU 20;
(D) Notifying the reference SOC and the lower-limit SOC to the navigation ECU 20, when requested by the navigation ECU 20; and
(E) Varying the value of the reference SOC, when requested by the navigation ECU 20.

The SOC is an index representing the amount remaining in the battery and the higher the value thereof, the larger the amount that is remaining. The present SOC represents the SOC of the battery 9 at present. Upon successively detecting the state of the battery 9, the HV control unit 10 repetitively renews or updates the value of the present SOC. The reference SOC is a value (for example, 60%) used in the HV mode. This value may be varied upon being controlled by the navigation ECU 20. The lower-limit SOC is a value of SOC (for instance, 30%) which is not allowed to be lowered any further.

In the HV mode, the HV control unit 10 changes over the execution and non-execution of the drive of the vehicle by the engine 1, drive of the vehicle by the electric motor 3, the charging by combustion and the charging by regeneration so that the present SOC maintains the reference SOC, while the hybrid vehicle is driven and traveling. For example, when the present SOC becomes lower than the reference SOC, the charging by combustion is effected to convert the energy of fuel supplied to the engine 1 into the electric energy of the battery 9. From the standpoint of executing the charging by combustion as described above, the HV mode is a traveling mode that permits the charging by combustion. The control in the HV mode is known and hence is not described here in detail.

In the EV mode, the HV control unit 10 drives the hybrid vehicle by using mainly the electric motor 3 between the engine 1 and the electric motor 3. The hybrid vehicle may normally be driven by only the electric motor 3. However, at special occasions, the hybrid vehicle may be driven by the engine 1 in combination with the electric motor 3, when the acceleration or the speed of the hybrid vehicle required by a driver is so high and the electric motor 3 will possibly be damaged if it is attempted to achieve such an acceleration or speed by only the electric motor 3. In the EV mode, further, the HV control unit 10 permits the charging by regeneration but does not permit the charging by combustion. This is because it is one of the objects of the EV mode to lower the present SOC of the battery 9.

The GPS sensor 11, azimuth sensor 12 and vehicle speed sensor 13 may be conventional sensors for specifying the position, traveling direction and traveling speed of the hybrid vehicle. The map DB storage unit 14 is a storage medium for storing the map data. The acceleration sensor 15 may also be a conventional sensor for detecting the acceleration of the vehicle. The gradient (angle of inclination) may be calculated by utilizing the vehicle speed sensor 13 and the acceleration sensor 15.

The map data include node data corresponding to a plurality of intersections and link data corresponding to a road section or a link connecting the intersection to another intersection. Each node data includes an identification number of the node, data related to the position thereof and data related to the kind thereof. A link data includes an identification number of the link (link ID), data related to the position thereof and data related to the kind thereof.

Here, the data related to the position of the link includes a data of position of a shape interpolation point included in the link, and a data of segment connecting the adjacent two of the nodes at both ends of the link and shape interpolation point. The data of each segment includes a segment ID of the segment, and the gradient, direction and length of the segment.

Figure 2:
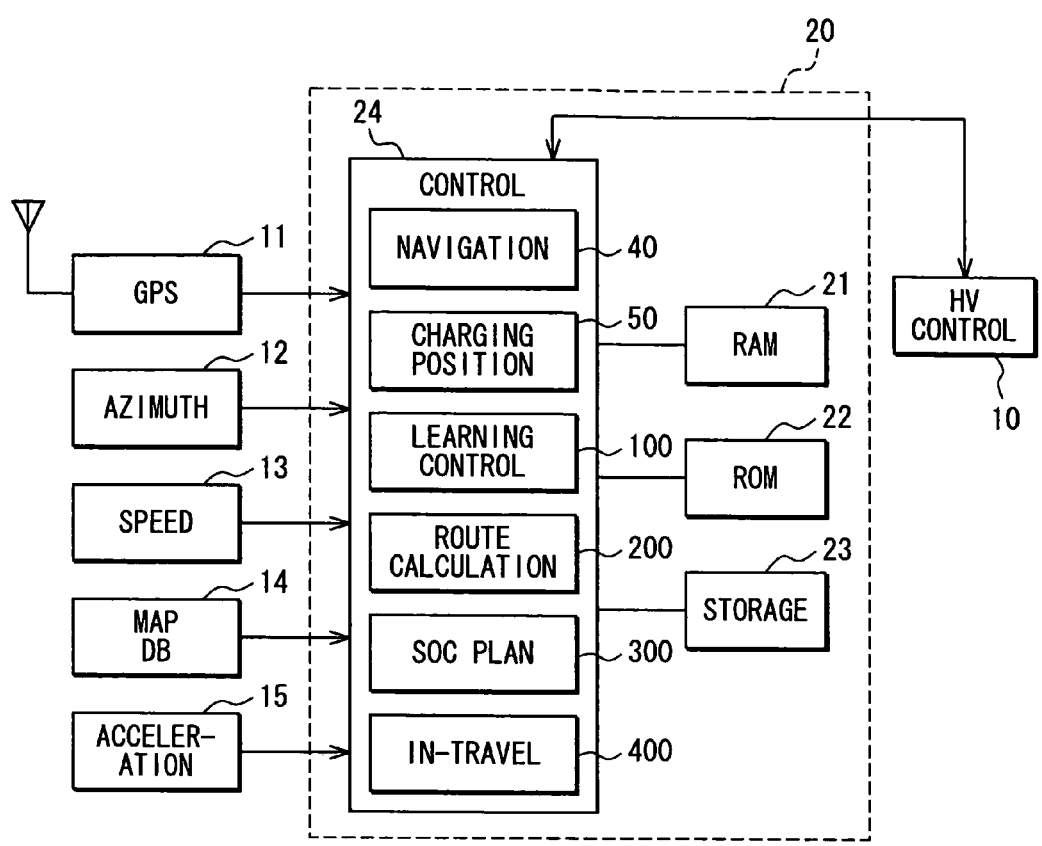
FIG. 2 is a block diagram illustrating a navigation ECU shown in FIG. 1 and other associated external units.

As shown in FIG. 2, the navigation ECU 20 includes a RAM 21, a ROM 22, a data writable durable storage medium 23 and a control unit 24. Storage medium is a storage medium that is capable of holding the data even if the supply of the main power source to the navigation ECU 20 is interrupted. Examples of such a durable storage medium 23 may include a nonvolatile storage media as a hard disk, a flash memory and an EEPROM, as well as a back-up RAM.

The control unit 24 executes a program read out from the ROM 22 or storage medium 23, reads out the data from the RAM 21, ROM 22 and durable storage medium 23 at the time of execution, writes the data into the RAM 21 and durable storage medium 23, and exchanges signals with the HV control unit 10, GPS sensor 11, azimuth sensor 12, vehicle speed sensor 13 and map DB storage unit 14.

The control unit 24 realizes navigation processing 40, charging position record processing 50, learning control processing 100, route calculation processing 200, SOC management plan preparation processing 300 and in-travel processing 400 by executing predetermined programs.

In the navigation processing 40, the control unit 24 displays to the driver a guide for driving the hybrid vehicle along a route (optimum route) up to a destination point determined by the route calculation processing 200.

In the charging position record processing 50, every time when the start of plug-in charging is notified from the HV control unit 10, the control unit 24 stores and records the present position received at that moment from The GPS sensor 11 in storage medium 23 as a charge-possible point. Alternatively, every time when the vehicle stops, the control unit 24 may record the present position received at that moment from The GPS sensor 11 in storage medium 23 as a charge-possible point. In this case, further, the charge-possible point may be recorded in storage medium 23 by relating the same to a segment to which the above point pertains. The correspondence between the charge-possible point and the segment can be made by collating the data of the present position from The GPS sensor 11 with the map data from the map DB storage unit 14. Upon executing the above processing at a plurality of points of plug-in charging, the data related to the plurality of charge-possible points are recorded in storage medium 23.

Figure 3:
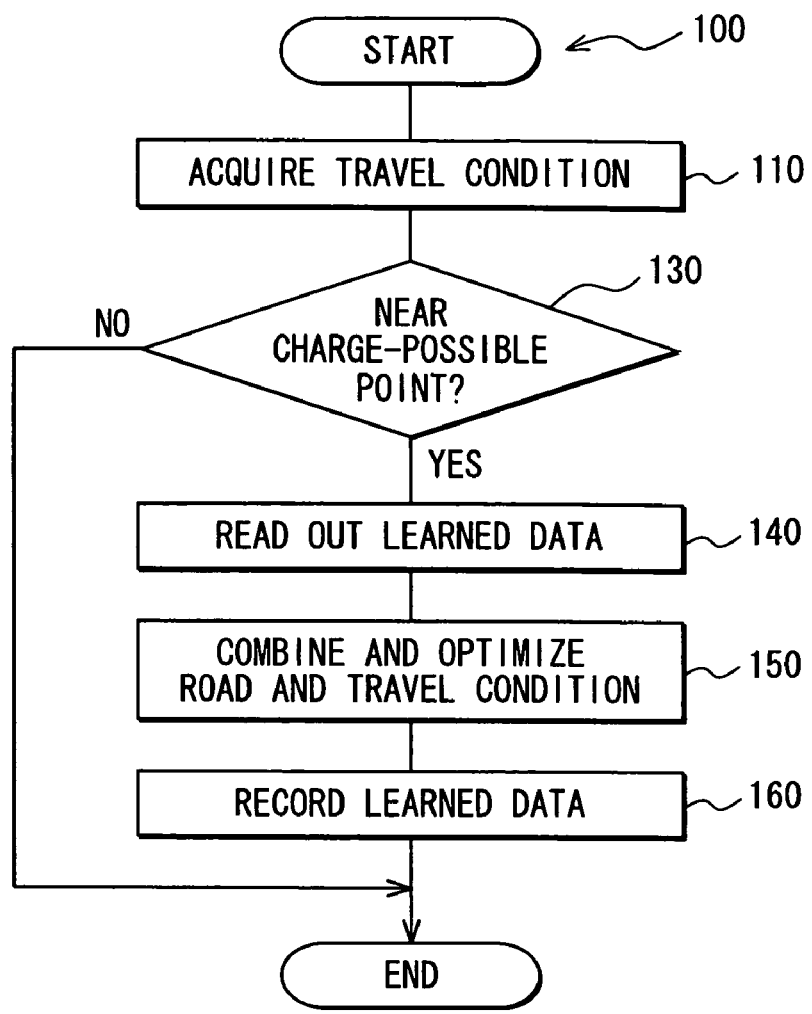
FIG. 3 is a flowchart of learning control processing executed in the first embodiment.

In the learning control processing 100, the control unit 24 records, in storage medium 23, the road which the hybrid vehicle has traveled and the history of traveling conditions that affect the consumption of electric power of the battery 9 in traveling the road for each of the segments. This learning control processing 100 is shown in FIG. 3. In this processing, even the same segment is handled as a different segment, if the traveling direction is not the same.

The control unit 24 repetitively executes the learning control processing 100, and acquires the data related to the present traveling condition every time at step 110. The traveling condition may include either one or both of the external environment when traveling and the behavior of the vehicle when traveling. The data acquired as the data of traveling condition include, for example, a link ID of the link where the vehicle is now traveling, a segment ID of a segment where the vehicle is now traveling, present direction of the vehicle, present speed of the vehicle gradient of the road surface at the present position, kind of the road of the link, and the amount of electric power consumed over the segment.

Here, the link ID and the segment ID can be specified by collating the data of the present position from The GPS sensor 11 with the map data from the map DB storage unit 14. Further, the direction of the vehicle can be acquired from the azimuth sensor 12. The present speed of the vehicle is acquired from the vehicle speed sensor 13. As the gradient of the road, there may be used the data related to the gradient of the segment in the link in the map data. The gradient may alternatively be calculated by using the outputs of the vehicle speed sensor 13 and of the acceleration sensor 15. The kind of the road is acquired from the map data. The traveling distance in the link may be specified by collating the data of the present position from The GPS sensor 11 with the map data from the map DB storage unit 14, or may be calculated by using the output of the vehicle speed sensor 13.

Next, it is checked at step 130 whether the present position is near the charge-possible point. This check may be made depending upon whether the present position acquired from The GPS sensor 11 is within a reference distance from any charge-possible point recorded by the charging position record processing 50. The reference distance may be a constant value that is stored in advance, a value that varies depending upon various conditions or a value determined at random within a predetermined range. If the present position is near the charge-possible point, then step 140 is executed. Otherwise, execution of the learning control processing 100 ends.

At step 140, the data that have been learned already are read out. The data of history of traveling condition of the segment ID acquired at step 110 are read out, if they are stored in storage medium 23.

Next, at step 150, the data of the segment read out at step 140 and the data of traveling condition of the segment newly acquired at step 110 are combined together and are optimized. The optimization method may be to calculate an average of the data that are read out and of the data that are newly acquired. If there is no history of traveling condition of the segment at step 140, the data acquired at step 110 are optimized at step 150. The optimized data of the traveling condition include the segment ID and, therefore, are the data associating the road with the data of traveling conditions on the road.

Next, at step 160, the optimized data are recorded in storage medium 23 as new history of traveling condition of the segment, i.e., as the learned data. After step 160, execution of one time of the learning control processing 100 ends.

Figure 4:
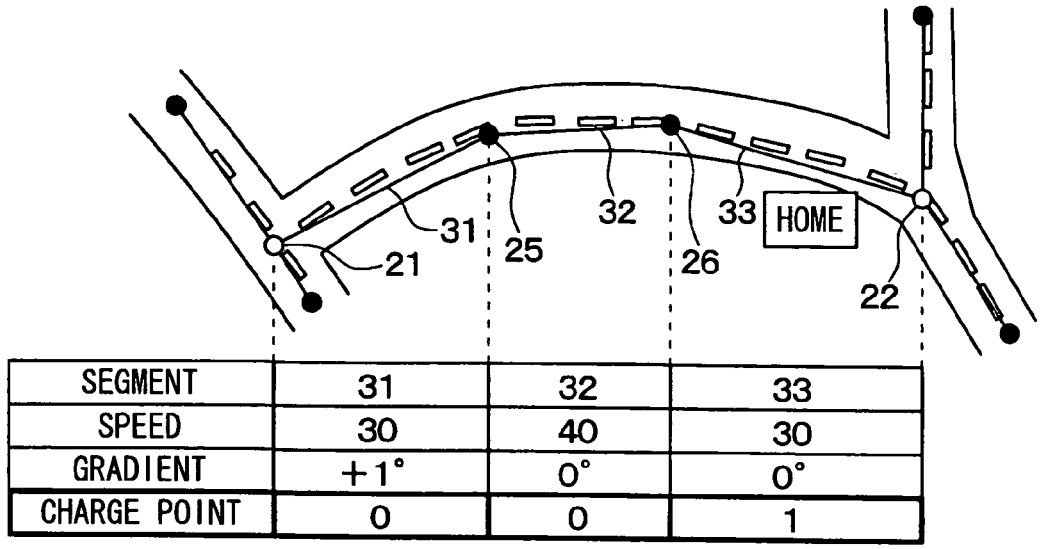
FIG. 4 is a schematic diagram illustrating a history of traveling conditions for each of the segments in the first embodiment.

Upon executing the learning control processing 100, histories of traveling conditions of segments near the charge-possible points are recorded in storage medium 23. FIG. 4 shows a table of the history of traveling conditions recorded in storage medium 23 in combination with the road associated with the history.

The table of history of traveling conditions includes the vehicle speeds and the gradients of road surfaces when traveling the segments 31 to 33 that are between two nodes 21 and 22, between which two shape interpolation points 25, 26 are provided. These data affect the consumption of electric power of the battery 9 when traveling the above segments 31 to 33. That is, the steeper the gradient of the road surface in the up direction and the higher the vehicle speed, the larger the load exerted on the engine and, therefore, the larger the consumption of electric power over the segment.

Concerning the segment 33 in which the charge-possible point (for instance, home) exists as recorded by the charging position record processing 50, the data indicating that the segment 33 includes the charge-possible point is also recorded in the table.

Figure 5:
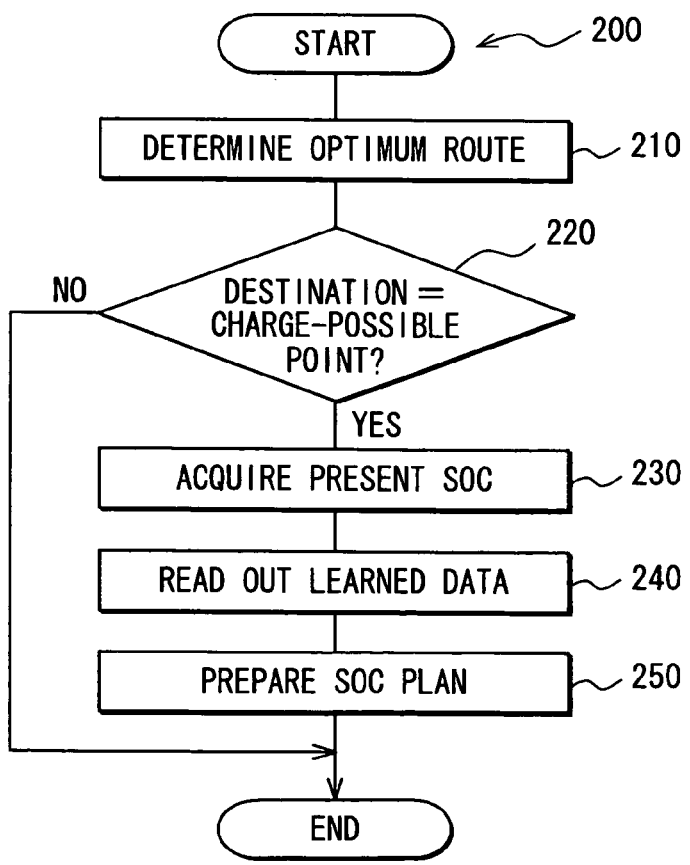
FIG. 5 is a flowchart of route calculation processing executed in the first embodiment.

The route calculation processing 200 is executed as shown in FIG. 5. The control unit 24 executes the route calculation processing 200 every time when a destination point is determined. Here, the destination point may be determined by the control unit 24 based on the input operation of a user by using an operation unit or may be determined by the control unit 24 based on the past history of traveling.

In executing the route calculation processing 200, the control unit 24, first, determines at step 210 an optimum route from the present position (start point) up to the destination point based on the map data or the like data.

Next, at step 220, it is checked whether the destination point is a charge-possible point by comparing the position of the destination point with the position of the charge-possible point recorded in storage medium 23. If the destination point is a charge-possible point, step 230 is executed. If it is not, execution of the route calculation processing 200 ends. At step 230, the data of the present SOC is acquired by requesting for the HV control unit 10 and receiving in response to the request the data of the present SOC from the HV control unit 10.

At step 240, the history of traveling conditions is read out, i.e., learned data are read out from storage medium 23 in a portion near the destination point on the optimum route, i.e., in a segment in a section (determination section) tracing from the destination point along the optimum route. The determination section may be a section within the above reference distance from the destination.

Next, at step 250, execution of the SOC management plan preparation processing 300 is called based on the data acquired at steps 230 and 240. Therefore, after the optimum route up to the destination point is determined, the control unit 24 executes the SOC management plan preparation processing 300 if the destination point is the charge-possible point.

Figure 6:
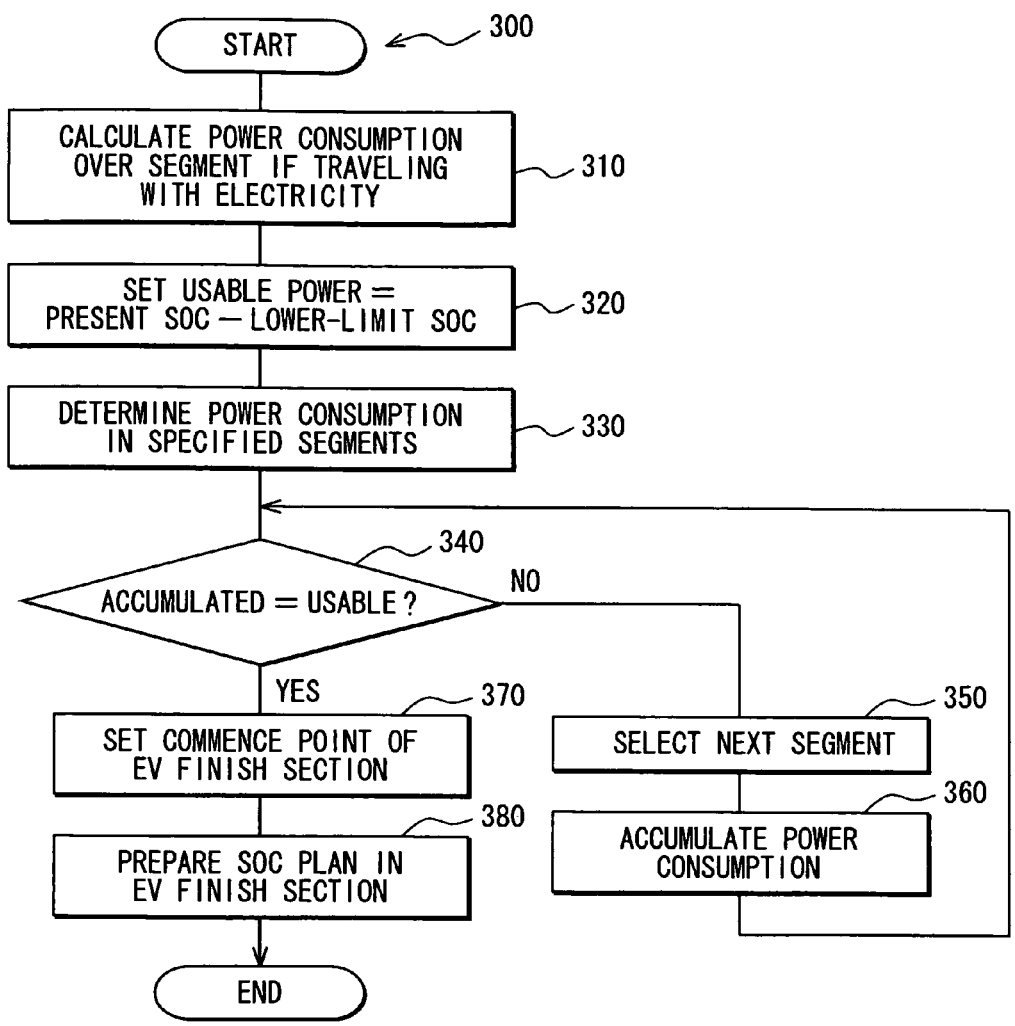
FIG. 6 is a flowchart of SOC management plan preparation processing executed in the first embodiment.

The SOC management plan preparation processing 300 is executed as shown in FIG. 6. The SOC management plan preparation processing 300 calculates the electric energy that can be utilized between an SOC (for instance, 60 percent) maintained during the HV traveling and the lower-limit value (for instance, 40 percent) allowed for the SOC, and specifies a section which the vehicle travels up to the destination point using the electric energy (EV finish section) based on the data learned in the determination section.

Specifically, first, calculation is conducted at step 310 concerning how much amount of electric power will be consumed if the vehicle travels in the determination section; i.e., the optimum amount of electric power consumption over the segment is calculated based on the data learned in the segment. The method of calculating the consumption of electric power is known and is not described here in detail.

Next, at step 320, a result acquired by subtracting the lower-limit SOC from the present SOC from the HV control unit 10 is set as the amount of electricity that can be used. The lower-limit SOC may be received from the HV control unit 10 by requesting it to the HV control unit 10 simultaneously with the reception of the present SOC, or may be received from the HV control unit 10 by requesting it to the HV control unit 10 at other time points.

Next, at steps 330 to 360, the specified segments are picked up successively in a direction of tracing the optimum route from the destination point (step 350), and the optimum amounts of electric power consumption in such segments are successively accumulated (steps 330 and 360). When the accumulated power consumption becomes equal to the usable amount of electricity that can be used (within a predetermined allowable error)(step 340), a position farthest from the destination point is used as a commence point of the EV finish section among the segments picked up last at that moment (step 370).

Figure 7:
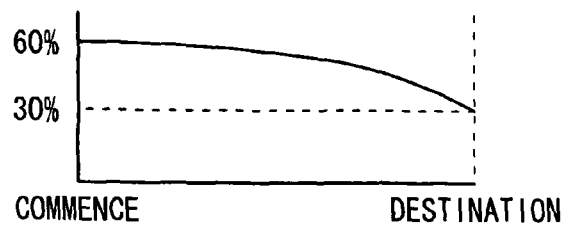
FIG. 7 is a graph showing a change in the SOC during the traveling optimum by the SOC management plan preparation processing in the first embodiment.

Next, an SOC management plan is prepared in the EV finish section (step 380). Specifically, an optimum change in the SOC in the EV finish section is specified based on the learned data in the case when the HV mode is changed over to the EV mode at the commence point and, thereafter, the EV mode continues up to the destination point. FIG. 7 shows an optimum change in the SOC. A value of the SOC that is changing as optimum is defined as a target SOC. After step 380, execution the SOC management plan preparation processing 300 ends.

Upon executing the SOC management plan preparation processing 300, it is allowed to specify a commence point of a section where the EV mode continues up to the destination on the optimum route up to the destination point. In this embodiment, the learned data are used only for determining the EV finish section and for determining the management plan in the EV finish section, but are not used for other sections on the optimum route. Further, the traveling mode is the HV mode in all other sections except the EV finish section.

Figure 8:
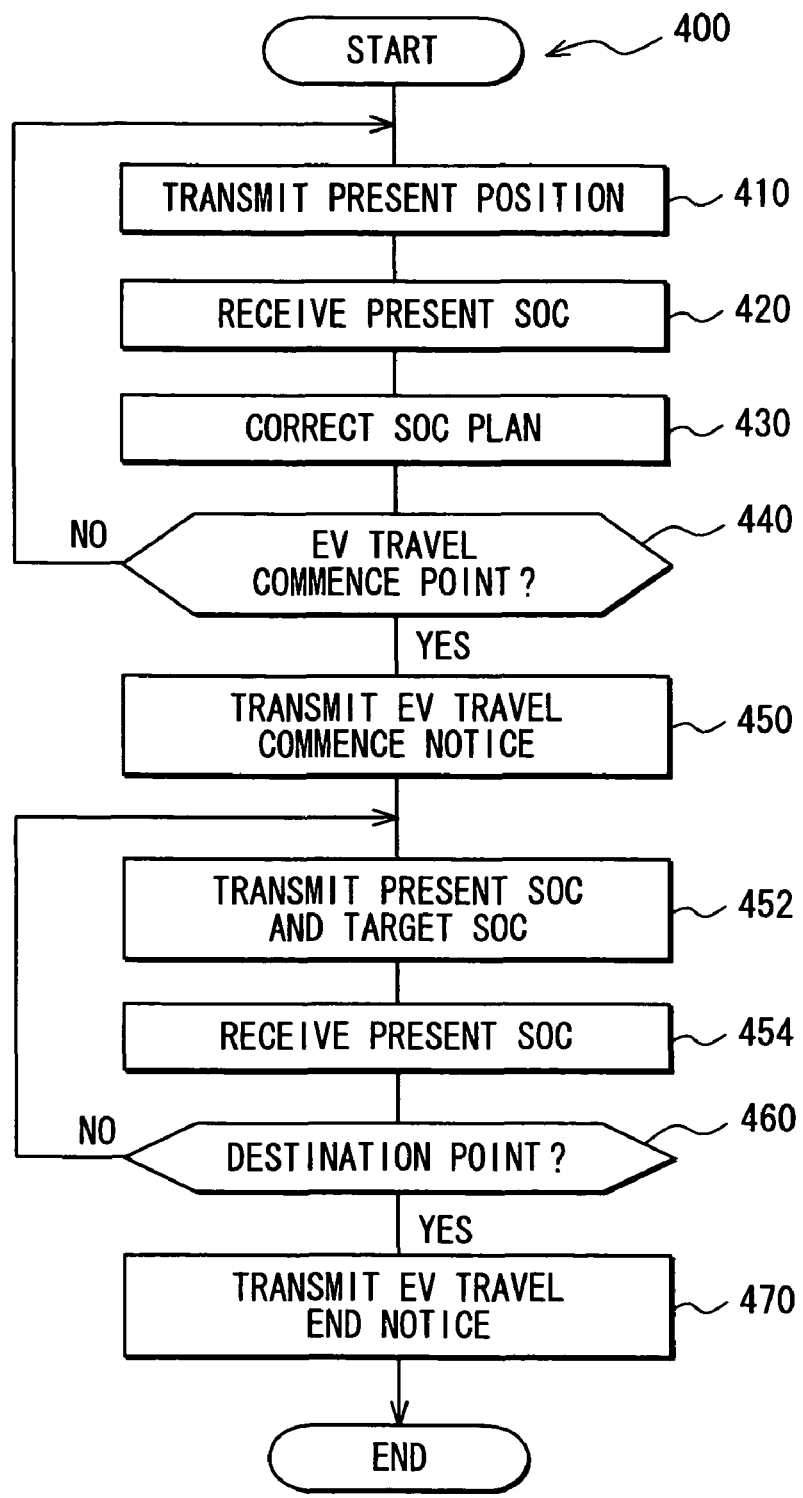
FIG. 8 is a flowchart of in-travel processing executed in the first embodiment.

The control unit 24 executes the in-travel processing 400 as shown in FIG. 8, when the destination point and the optimum route up to the destination point have been determined, when the SOC management plan preparation processing 300 has been executed for the optimum route, when the navigation processing 40 is displaying a guide of the optimum route and when the hybrid vehicle is traveling.

In executing the in-travel processing 400, the control unit 24, first, transmits at step 410 the present position or the like as an economy control assist data to the HV control unit 10. Next, at step 420, the present SOC is received as it is transmitted from the HV control unit 10 successively. At step 430, the SOC management plan preparation processing 300 is executed again to correct the SOC management plan (i.e., commence point of the EV finish section and a change in the amount of electric power consumption in the EV finish section) based on the present SOC that is received. At step 440, it is checked whether the hybrid vehicle has arrived at the commence point of the EV finish section. If not still arriving, steps 410 to 440 are executed again. If arriving already, then step 450 is executed. Thus, the control unit 24 finely adjusts the SOC management plan based on the present SOC repetitively until the vehicle arrives at the commence point.

In the HV mode, the HV control unit 10 suitably executes the drive of the vehicle by the engine 1, drive of the vehicle by the electric motor 3, charging by regeneration and charging by combustion, so that the SOC assumes a value equal to that of the reference SOC. In practice, however, the value of the present SOC does not necessary come in agreement with the reference SOC but varies from moment to moment. As the value of the present SOC increases, the distance of the EV finish section becomes longer. As the value of the present SOC decreases, the distance of the EV finish section becomes shorter. Therefore, by repetitively calculating the commence point of the EV finish section in compliance with a fluctuation in the present SOC, the present SOC at the start point of the EV finish section can be brought into more correct agreement with the target SOC and, therefore, the present SOC can be more correctly lowered down to the lower-limit SOC at the destination point.

At step 450, a notice of commencing the EV traveling is transmitted to the HV control unit 10 which, therefore, changes the traveling mode from the HV mode over to the EV mode. Next, at step 452, the present SOC and the target SOC corresponding to the present position are transmitted as economy control assist data to the HV control unit 10. Next, at step 454, the present SOC is received from the HV control unit 10.

At step 460, it is checked whether the hybrid vehicle has arrived at the destination point based on a signal from the GPS sensor 11. Steps 452 to 460 are repeated until the hybrid vehicle arrives at the destination point. After having arrived, step 470 is executed. At step 470, a notice of end of EV traveling is transmitted to the HV control unit 10 which, therefore, changes the traveling mode from the EV mode over to the HV mode.

Upon executing the in-travel processing 400 as described above, the control unit 24 corrects the SOC management plan (step 430) in the HV traveling section before arriving at the commence point of the EV finish section (step 440) based on the present SOC successively received from the HV control unit 10 (step 420). When the hybrid vehicle arrives at the commence point of the EV finish section (step 440), the control unit 24 enables the HV control unit 10 to commence the EV mode (step 450). Thereafter, when the hybrid vehicle arrives at the destination point (step 460), the EV mode of the HV control unit 10 ends (step 470). At the commence position of the EV finish section, therefore, the traveling mode is changed from the HV mode over to the EV mode which, thereafter, continues until arriving at the destination point.

The control unit 24 records a charge-possible point through the charging position record processing 50, and records the history of traveling conditions near the charge-possible point through the learning control processing 100. Further, when the destination point on the optimum route is a charge-possible point (route calculation processing 200 at step 220), the control unit 24 determines the sections where the EV traveling can be continued before the charge-possible point through the SOC management plan preparation processing 300, and controls the HV control unit 10 by the in-travel processing 400 so as to change over the HV traveling and the EV traveling according to the determination.

As described above, the navigation ECU 20 determines all sections from the commence point of the EV finish section up to the destination point as the sections where the EV mode is to be used, so that the electric power of the battery is really consumed in the above sections. By employing a relatively simple method, i.e., by arranging a package of HV mode sections before the EV finish section as described above, the control operation is easily realized such that the remaining amount of the battery becomes the lower-limit value when the vehicle arrives at the destination point which is the charge-possible point.

The commence point is determined by utilizing the amount of electric power consumption over continuous sections from a given point on the optimum route up to the destination point along the optimum route. The amount of the electric power consumption is determined by the learn processing by using a history of traveling conditions that affect the electric power consumption of the battery after having traveled the above sections in the past. Therefore, the calculated amount of electric power consumption becomes close to the reality of the road and the hybrid vehicle, making it possible to more correctly lower the remaining amount of the battery to the lower-limit value at the destination point.

Further, the navigation ECU 20 records the data related to the history of traveling conditions if the hybrid vehicle is within a reference distance from a charge-possible point but does not record the data related to the history of traveling conditions if the hybrid vehicle is outside the reference distance from the charge-possible point.

As described above, the history of traveling conditions is recorded in only a minimum range required for calculating the consumption of electric power in the determination section, decreasing the burden of processing for recording the history of traveling conditions and saving the size of the storage region for storing the history of traveling conditions.

Further, the navigation ECU 20 calculates the amount of battery power consumption by using the learned data in only the EV finish section on the optimum route. Therefore, the navigation ECU 20 needs to bear a processing burden smaller than that of when the learned data are used over the whole optimum route.

(Second Embodiment)

Figure 9:
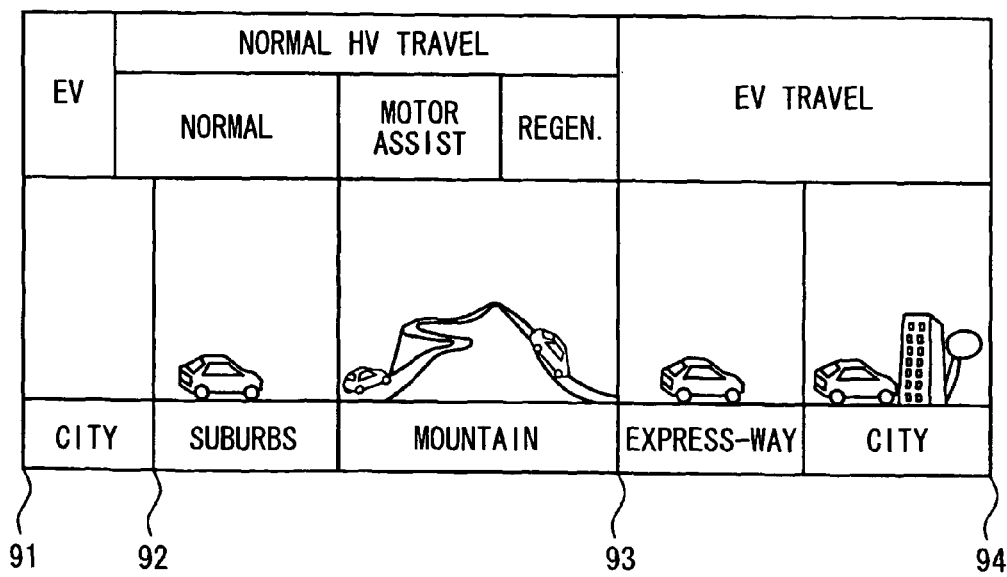
FIG. 9 is a schematic diagram of an SOC management plan executed in a second embodiment of the present invention.

Next, a second embodiment is shown in FIG. 9 and different from the first embodiment with respect to the combination of the EV mode and HV mode. Specifically, in the first embodiment, the traveling mode is the HV mode over the whole sections from the start point up to the commence point of the EV finish section on the optimum route up to the destination point. In the second embodiment, as shown in FIG. 9, the traveling mode is the EV mode from a start point 91 up to a given point (end point) 92 among the sections from the start point 91 up to a commence point 93 of the EV finish section, and the traveling mode is the HV mode from the end point 92 up to the commence point 93 of the EV finish section.

To realize the above operation, the control unit 24 in the SOC management plan preparation processing 300 calculates the amount of battery power consumption when the EV mode is used over a section continuing along the optimum route from the start point 91 on the optimum route based on the data learned over the section. Here, the section continuing along the optimum route from the start point 91 is a section within a reference distance from the start point 91 on the optimum route. In the learning control processing 100, the control unit 24 further records the learned data in the storage medium 23 in the above section.

In the SOC management plan preparation processing 300, further, the control unit 24 may determine an end point 92 of the section where the EV mode is continuously used from the start point 91 along the optimum route based on the calculated amount of electric power consumption. Specifically, if a value acquired by subtracting the reference SOC from the present SOC is larger than a predetermined amount, the subtracted result is regarded as the amount of electricity that can be consumed, the segments are picked up from the start point 91 along the optimum route, and the estimated amounts of electric power consumption over the segments are accumulated successively. If the accumulated result becomes equal to the amount of electricity that can be used (within a predetermined allowable error), a position farthest ahead from the start point 91 is regarded to be the end point 92 among the segments picked up last at that moment. The value acquired by subtracting the reference SOC from the present SOC will be larger than the predetermined amount when, for example, the plug-in charge has just been completed.

At the end point 92, the control unit 24 so controls the HV control unit 10 as to change the traveling mode of the hybrid vehicle from the EV mode over to the HV mode according to the determination, and so controls the HV control unit 10 as to maintain the HV mode from the end point 92 up to the commence point 93.

By employing a relatively simple method, i.e., by using the EV mode in only the first continuous section and in the last continuous section of the optimum route as described above, the control operation is easily realized such that the remaining amount of the battery becomes the lower-limit value when the vehicle has arrived at the destination point 94 which is the charge-possible point.

The control unit 24 calculates the amount of battery power consumption by using the history recorded through the learning control processing 100 in only the section from the start point 91 to the end point 92 and the section from the commence point 93 to the destination point 94 of the optimum route. This helps eliminate the waste that results from calculating the electric power consumption over the sections where the electric power consumption does not have to be calculated.

(Third Embodiment)

Figure 10:
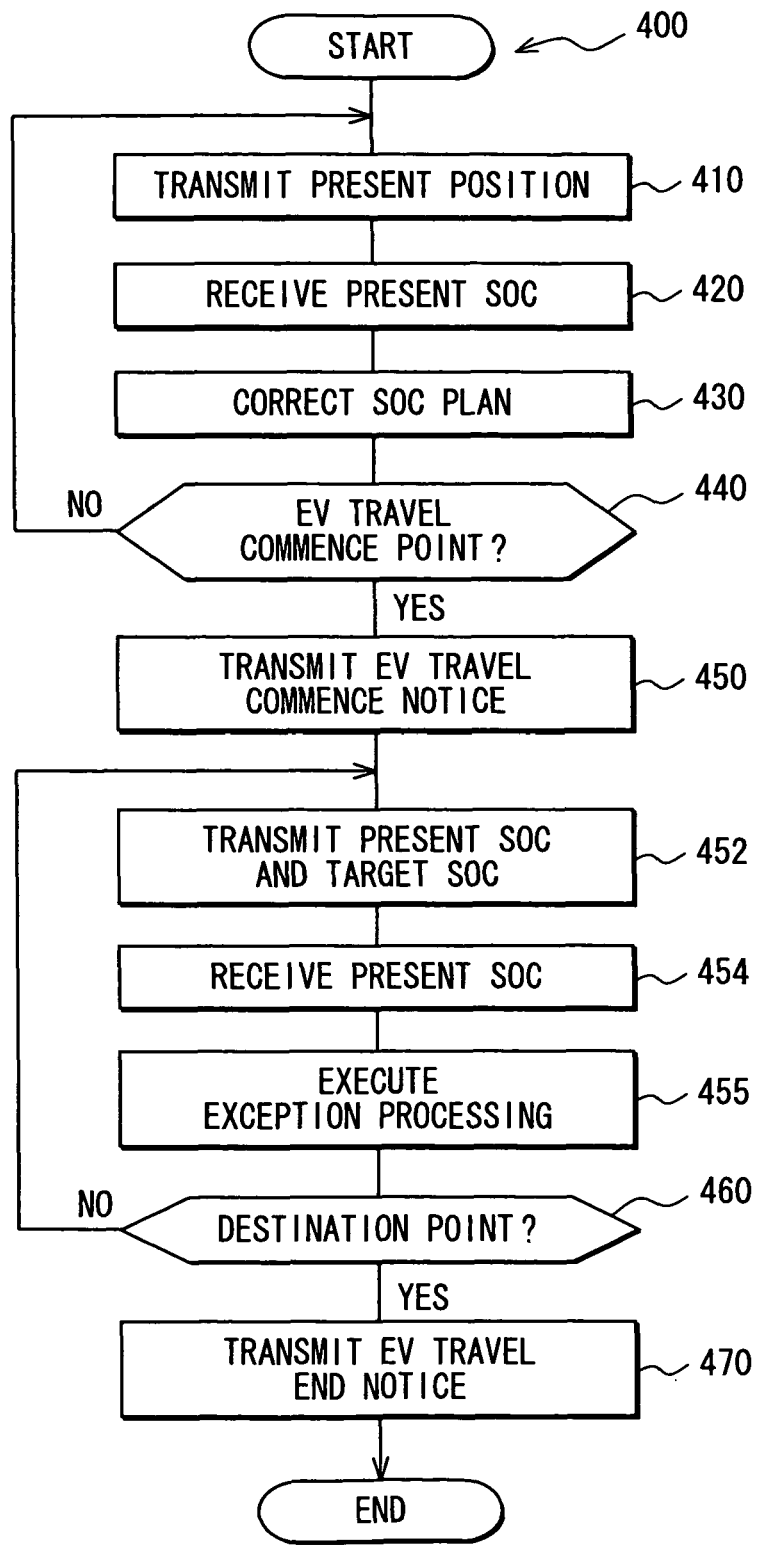
FIG. 10 is a flowchart of in-travel processing executed in a third embodiment of the present invention.
Figure 11:
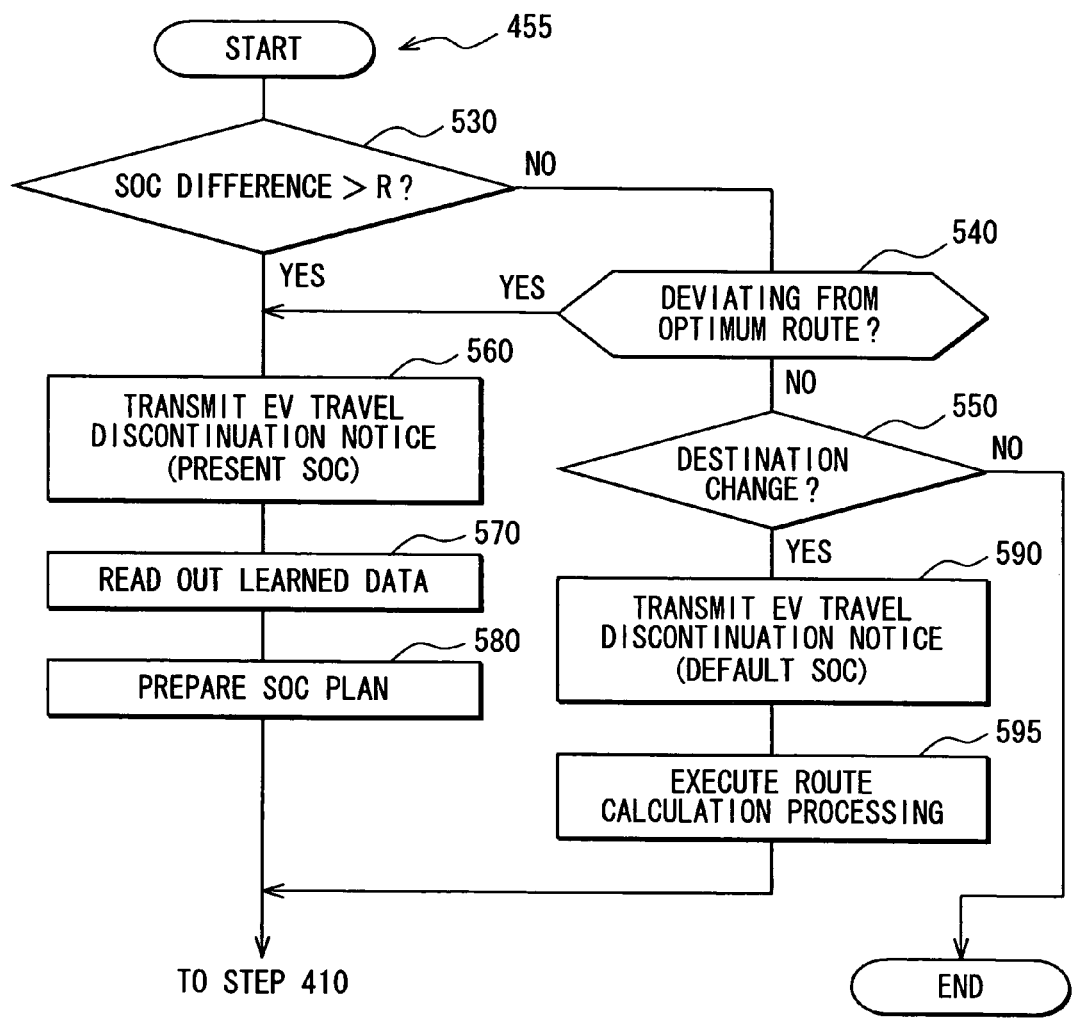
FIG. 11 is a flowchart of exception processing executed in the third embodiment.

Next, a third embodiment is shown in FIGS. 10 and 11. This embodiment is different from the first embodiment in that the control unit 24 in executes an in-travel processing 4000 shown in FIG. 10 instead of the in-travel processing 400 (FIG. 8). The in-travel processing 4000 is different from the in-travel processing 400 in that an exception processing of step 455 is executed between step 454 and step 460. The exception processing is for checking whether it has become necessary to change the SOC management plan and for preparing the SOC management plan again if it has become necessary.

In the exception processing 455 shown in FIG. 11, the control unit 24, first, compares at step 530 the present SOC received just before with the target SOC corresponding to the present position and checks whether the difference is larger than a reference width or, more closely, whether the present SOC is smaller than the target SOC by more than a reference width R. If the check result is affirmative, step 560 is executed. If the check result is negative, step 540 is executed. The reference width may be a predetermined value that has been stored in advance or may be a value that varies depending upon various conditions or may be a value determined at random within a predetermined range.

At step 540, it is checked whether the hybrid vehicle has deviated from the optimum route. If the hybrid vehicle is not deviating, step 550 is executed. If the hybrid vehicle is deviating, a new optimum route is calculated up to the destination point and, thereafter, step 560 is executed. At step 550, it is checked whether the destination point is changed. If the destination point is changed, step 590 is executed. If the destination point has not been changed, step 460 is continuously executed after the exception processing. The destination will be changed if, for example, a passenger inputs a new destination point by using an operation device.

Therefore, if the difference between the target SOC and the present SOC is not larger than the reference width R, the hybrid vehicle is not deviating from the optimum route and the destination has not been changed, then the processing of steps 530, 540, 550, 460, 452 and 454 are repeated in this order.

If the difference between the target SOC and the present SOC exceeds the reference width R or if the hybrid vehicle is deviated from the optimum route, the control unit 24, first, transmits to the HV control unit 10 a notice of discontinuing the EV traveling and a notice of substituting a value of the present SOC for the value of the reference SOC at step 560. Therefore, the HV control unit 10 returns the traveling mode back to the HV mode, and substitutes the value of the present SOC for the value of the reference SOC (reference SOC=present SOC). Therefore, the HV control unit 10 controls the engine 1 and the electric motor 3 and the like so as to maintain the present SOC value.

Further, step 570 executes the same processing as that of step 240 of FIG. 5 to thereby read out learned data associated with the vicinity of the destination point on the optimum route and step 580 calls the execution of the SOC management plan preparation processing 300. Step 580 is followed by step 410 and subsequent steps of the in-travel processing 4000 (FIG. 10).

As described above, the remaining amount of battery is detected while traveling the EV finish section on the optimum route, and the SOC management plan preparation processing 300 is executed again if the remaining amount that is detected is less than the optimum amount thereof by more than the reference width. If the optimum change in the remaining amount of battery is greatly different from the remaining amount of battery in the practical traveling, i.e., if the optimum amount of battery power consumption is not correct in the EV mode traveling in the EV finish section that has been determined in advance, then a new EV finish section is determined. Therefore, the charge and discharge of the battery 9 can be suitably controlled to further comply with the actual conditions.

Further, while traveling from the commence point up to the destination point on the optimum route, the hybrid vehicle may deviate from the optimum route though there is no change in the destination point. In this case, too, the SOC management plan preparation processing 300 is executed again to determine a new EV finish section. Therefore, even in an exceptional case where the hybrid vehicle is deviated from the optimum route, the charge and discharge can be suitably controlled to further comply with the actual conditions.

In exceptional cases where the target SOC is away from the present SOC or the hybrid vehicle is deviated from the optimum route, the SOC of when the exception has occurred is maintained in the HV mode until the hybrid vehicle enters into the new EV finish section. This is the operation based on an idea in that in the exceptional case where there is no change in the destination point, the destination point can in may cases be reached soon, and the SOC is not set to be too high so will not to wastefully consume the fuel.

At step 590 after an exception of a destination change has occurred, a notice of discontinuing the EV traveling and a notice of substituting a value (for instance, 60 percent) of a default SOC for the value of the reference SOC are transmitted to the HV control unit 10. Therefore, the HV control unit 10 returns the traveling mode back to the HV mode and substitutes the value of the default SOC for the value of the reference SOC. The default SOC is a predetermined default value of the reference SOC. The HV control unit 10 stores the default SOC. Therefore, the HV control unit 10 controls the engine 1 and the electric motor 3 and the like so as to maintain the ordinary reference SOC value. Next, at step 595, the route calculation processing 200 shown in FIG. 5 is executed again for the new destination point. Thereafter, step 410 and subsequent steps of the in-travel processing 4000 are executed.

When the destination point is changed while traveling from the commence point toward the destination point on the optimum route as described above, a new optimum route is calculated from the present position up to the destination point based on that the destination point after being changed is another charge-possible point, and the SOC management plan is prepared again based on the destination point after being changed and on the new optimum route.

A change in the destination point is accompanied by a change in the optimum route up to the new destination point. Therefore, the determination function is executed again as described above to determine a commence point of a new EV mode on the new route up to the destination. Therefore, even in an exceptional case where the hybrid vehicle deviates from the optimum route, the charge and discharge can be suitably controlled to meet the existing conditions.

In the exceptional case where the destination point is changed, the reference SOC of default (which is higher than the present SOC in this case) is maintained in the HV mode until the hybrid vehicle enters into the new EV finish section. This is the operation based on an idea in that in such exceptional case as the destination point is changed, it is not certain that the destination point can be reached soon.

In the above embodiment, the navigation ECU 20 operates to control the charge/discharge of the battery 9. Further, the control unit 24 functions as in-travel control means upon executing the in-travel processing 400, functions as first recording means upon executing the charging position record processing 50, functions as second recording means upon executing the learning control processing 100, and functions as determining means upon executing the SOC management plan preparation processing 300. Further, in the storage medium 23, a portion recording the data of charge-possible points corresponds to a charge-possible point storage medium. In the storage medium 23, further, a portion recording the history through the learning control processing 100 corresponds to an electric power consumption data storage medium. Further, the storage medium of the map DB storage unit corresponds to the electric power consumption data storage medium.

(Other Embodiments)

The above embodiments may be modified in many other ways.

For example, even in a section where the traveling mode is the HV mode, the control unit 24 may calculate the planning of time points for executing the drive of the engine 1, drive of the electric motor 3 and charging by combustion in the range of the HV mode by using the learned data.

At steps 240 and 570, further, the history of traveling conditions on the segments in the determination section, i.e., the learned data, are read out from storage medium 23, and are used as the data of electric power consumption in the SOC management plan preparation processing 300. At steps 240 and 570, however, the map data on the segments in the determination section may be read out, and may be used as the data of electric power consumption in the SOC management plan preparation processing 300.

Further, the calculation of the amount of electric power consumption, the preparation of the SOC management plan and the object that is related to the charge-possible point are made with respect to each segment, but may alternatively be made with respect to each link.

Further, the charge-possible point need not be limited to only a position where the charging is really effected, but may be a charge-possible point that has been stored in advance or may be a charge-possible point set by the user.

Immediately after the plug-in charge, further, the HV control unit 10 may use the EV mode until the present SOC decreases down to the reference SOC. If this operation is applied to the first embodiment, then the change-over, that is, EV mode→HV mode→EV mode as shown in FIG. 9 can be realized without the need of determining the end point 92 in the SOC management plan preparation processing 300 by the control unit 24.

Further, if the SOC management plan preparation processing 300 is executed by more than a reference number of times (for instance, 5 times) without no change in the destination point, then the control unit 24 may so control the HV control unit 10 as to continue the HV traveling up to the destination. This prevents the processing from being wastefully continued under a condition where the SOC management plan preparation processing is not effective.

In the above embodiments, further, the functions realized by executing the programs by the control unit 24 may further be realized by using a hardware having such functions (for instance, FPGA capable of programming circuit configurations).

What is claimed is:

1. A charge/discharge control apparatus for a battery of a hybrid vehicle having, as traveling power sources, an internal combustion engine driven by combustion of fuel and an electric motor driven by the battery, the control apparatus comprising:

means for changing a traveling mode of the hybrid vehicle between a first mode and a second mode, the first mode using the internal combustion engine and the electric motor as power sources for driving the hybrid vehicle while allowing the battery to be electrically charged by the internal combustion engine, and the second mode mainly using the electric motor as the power source for driving the hybrid vehicle while prohibiting the charging of the battery by the internal combustion engine; and means for reading a charge-possible point from a charge-possible point storage medium storing the charge-possible point at which the battery can be electrically charged with electric power from a power source outside of the hybrid vehicle, the reading means calculating an amount of battery power consumption when the second mode is used over a continuous section tracing along an optimum route from a destination point which is the charge-possible point that is read out based on electric power consumption data stored in an electric power consumption data storage medium and indicative of electric power consumption that affects the battery power consumption when traveling a plurality of roads, and the reading means determining a commence point of the continuous section where the second mode is to be used up to the destination point along the optimum route based on the calculated amount of electric power consumption, so that a remaining amount of the battery becomes smaller than a predetermined lower-limit value at the destination point, wherein the changing means changes the traveling mode of the hybrid vehicle from the first mode over to the second mode at the commence point according to the determination by the reading means.

2. The charge/discharge control apparatus according to claim 1, wherein:

the reading means calculates the amount of battery power consumption when the second mode is used over a continuous section based on a history recorded in a recording unit, and to determine an end point of the continuous section from the start point along the optimum route where the second mode is continuously used based upon the calculated amount of electric power consumption; and the changing means changes the traveling mode of the hybrid vehicle from the second mode over to the first mode at the end point according to a determination by the reading means, and to maintain the first mode from the end point up to the commence point.

3. The charge/discharge control apparatus according to claim 2, wherein:

the reading means calculates the amount of battery power consumption by using the electric power consumption data in the electric power consumption data storage medium in only a section from the start point to the end point and a section from the commence point to the destination point on the optimum route.

4. The charge/discharge control apparatus according to claim 1, wherein:

the reading means calculates the amount of battery power consumption by using the electric power consumption data in the electric power consumption data storage medium in only a section from the commence point to the destination point on the optimum route.

5. The charge/discharge control apparatus according to claim 1, wherein:

the reading means estimates a change in a remaining amount of the battery when traveling along the optimum route from the commence point up to the destination point based upon the electric power consumption data in the electric power consumption data storage medium; and the changing means detects the remaining amount of the battery while traveling on the optimum route from the commence point to the destination point, and executes an operation of the reading means again if the detected remaining amount is less than the amount estimated by the reading means by more than a reference width.

6. The charge/discharge control apparatus according to claim 1, wherein:
the reading means calculates, while traveling on the optimum route from the commence point to the destination point, a new optimum route from the present position to the destination point if the hybrid vehicle deviates from the optimum route without any change in the destination point, and executes an operation of the reading means again for the new optimum route.

7. The charge/discharge control apparatus according to claim 1, wherein:
the charge-possible point storage medium stores another charge-possible point where the battery can be electrically charged with electric power from an external power source; and
the reading means calculates, in case the destination point is changed while traveling on the optimum route from the commence point to the destination point, a new optimum route from the present position up to the destination point based on that the destination point after being changed is the another charge-possible point, and executes an operation of the reading means again for the destination point after being changed and for the new optimum route.

8. The charge/discharge control apparatus according to claim 1, wherein the reading means includes:
means for recording, in the charge-possible point storage medium, a charge-possible point where the battery can be electrically charged upon being supplied with electric power from a power source outside of the hybrid vehicle.

9. The charge/discharge control apparatus according to claim 1, wherein the reading means includes:
means for recording, in the electric power consumption data storage medium, a road which the hybrid vehicle has traveled and the history of traveling conditions that affect the consumption of battery power when traveling on the road.

10. The charge/discharge control apparatus according to claim 9, wherein:
the recording means is configured to record the road which the hybrid vehicle has traveled and the history of traveling conditions that affect the consumption of battery power when traveling on the road if the hybrid vehicle is within a reference distance from the charge-possible point, but to record neither the road which the hybrid vehicle has traveled nor the history of traveling conditions that affect the consumption of battery power when traveling on the road if the hybrid vehicle is not within a reference distance from the charge-possible point.

11. A non-transitory storage device storing therein a control program that is executable to control charge/discharge of a battery of a hybrid vehicle that has, as traveling power sources, an internal combustion engine driven by combustion of fuel and an electric motor driven by the battery, the hybrid vehicle changing over a traveling mode between a first mode and a second mode, the first mode using the internal combustion engine and the electric motor as power sources for driving the hybrid vehicle while allowing the battery to be electrically charged by the internal combustion engine, and the second mode mainly using the electric motor as the power source for driving the hybrid vehicle while prohibiting the charging of the battery by the internal combustion engine, the control program including steps of:
reading out a charge-possible point from a charge-possible point storage medium storing the charge-possible point at which the battery can be electrically charged with electric power from a power source outside of the hybrid vehicle;
calculating an amount of battery power consumption when the second mode is used over a continuous section tracing along an optimum route from a destination point which is the charge-possible point that is read out based on electric power consumption data stored in an electric power consumption data storage medium and indicative of electric power consumption that affects the battery power consumption when traveling a plurality of roads; and
determining a commence point of the continuous section where the second mode is to be used up to the destination point along the optimum route based on the calculated amount of electric power consumption, so that a remaining amount of the battery becomes smaller than a predetermined lower-limit value at the destination point,
wherein the traveling mode of the hybrid vehicle is changed from the first mode over to the second mode at the commence point.

\* \* \* \* \*